United States Patent
Kominami et al.

(10) Patent No.: US 8,664,613 B2
(45) Date of Patent: Mar. 4, 2014

(54) RADIATION MEASUREMENT DEVICE AND NUCLEAR MEDICINE DIAGNOSIS SYSTEM

(75) Inventors: Shinya Kominami, Mito (JP); Tomoyuki Seino, Hitachi (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 13/580,786

(22) PCT Filed: Feb. 10, 2011

(86) PCT No.: PCT/JP2011/052866
§ 371 (c)(1),
(2), (4) Date: Aug. 23, 2012

(87) PCT Pub. No.: WO2011/111467
PCT Pub. Date: Sep. 15, 2011

(65) Prior Publication Data
US 2013/0048869 A1    Feb. 28, 2013

(30) Foreign Application Priority Data
Mar. 10, 2010   (JP) .................... 2010-052535

(51) Int. Cl.
*G01T 1/24*    (2006.01)

(52) U.S. Cl.
USPC ............. 250/370.08; 250/370.01; 250/370.12

(58) Field of Classification Search
USPC .................................................. 250/370.08
See application file for complete search history.

(56) References Cited

U.S. PATENT DOCUMENTS 6,333,505 B1 * 12/2001 Agano ................... 250/370.07
6,362,484 B1 *  3/2002 Beyne et al. .............. 250/374
2003/0090873 A1 *  5/2003 Ohkouchi ................ 361/704
2004/0144996 A1 *  7/2004 Inoue ....................... 257/200
2006/0138336 A1    6/2006 Seino et al.
2009/0194701 A1    8/2009 Seino et al.

FOREIGN PATENT DOCUMENTS

JP    63-204187 A    8/1988
JP    2006-184139 A  7/2006
JP    2009-156800 A  7/2009

OTHER PUBLICATIONS

Hitomi et al.; "A method for suppressing polarization phenomena in TlBr detectors"; Nuclear Instruments and Methods in Physics Research Section A; 2008; pp. 102-104; vol. 585.
Hitomi et al.; "Improvement of energy resolutions in TlBr detectors"; Nuclear Instruments and Methods in Physics Research Section A; 2009; pp. 112-115; vol. 607.

* cited by examiner

*Primary Examiner* — Marcus Taningco
(74) *Attorney, Agent, or Firm* — Mattingly & Malur, PC

(57) ABSTRACT

The present invention provides a radiation measurement device, which shortens periodic interruption periods in the radiation measurements and prevents damage to the amplifier, and a nuclear medicine diagnosis system using such measurement device. The radiation measurement device comprises a semiconductor radiation detector detecting a radiation, a capacitor, which applies voltage to the semiconductor radiation detector, one or more direct current power supplies each capable of making either of positive and negative electric charge collect on one of the electrodes of the capacitor, a constant-current device, which conducts an electric current from the direct current power supplies to the one of the electrodes of the capacitor, and two or more switching devices installed in the wiring connecting the direct current power supplies and the one of the electrodes of the capacitor. Further disclosed is a nuclear medicine diagnosis system equipped with such radiation measurement device.

10 Claims, 4 Drawing Sheets

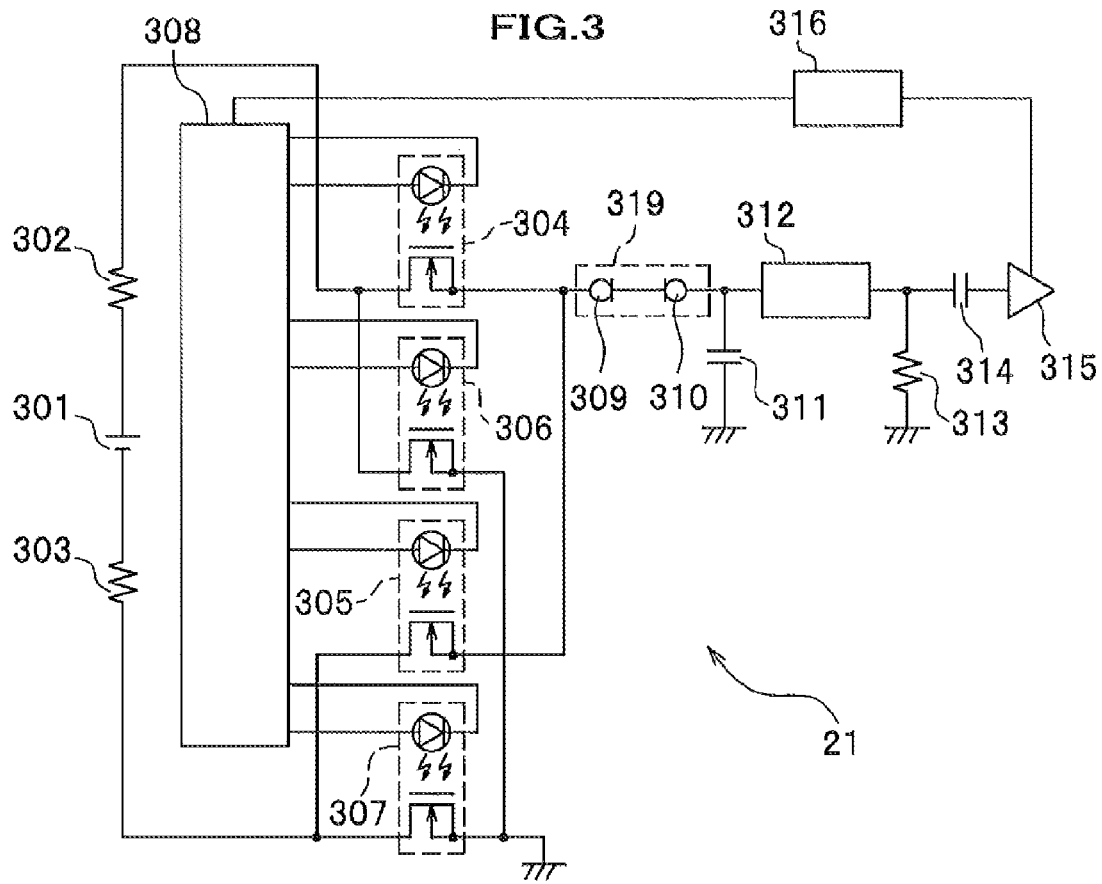

RADIATION MEASUREMENT DEVICE AND NUCLEAR MEDICINE DIAGNOSIS SYSTEM

CROSS REFERENCE TO RELATED APPLICATIONS

This application is a National Stage Application of PCT/JP2011/052866, filed on Feb. 10, 2011, and which application is incorporated herein by reference. To the extent appropriate, a claim of priority is made to the above-disclosed application.

FIELD OF THE INVENTION

The present invention relates to a radiation measurement device and a nuclear medicine diagnosis system comprising such measurement device.

BACKGROUND ART

The nuclear medicine diagnosis system, nowadays widely in use, comprises a radiation measurement device, which measures radiations such as gamma rays. Typical nuclear medicine diagnosis systems are a gamma camera, a Single Photon Emission Computed Tomography (SPECT), and a Positron Emission Tomography (PET). In addition, demand for radiation measurement devices such as the one used in dosimeters as countermeasures against radiation-bombing terrorism is rising in the field of the homeland security.

The radiation detectors mounted on the radiation measurement devices conventionally combines a Scintillator (a device which absorbs radiation energy and generates fluorescence) and a photo multiplier tube. Nowadays, technologies of applying semiconductor radiation detectors comprising semiconductor crystals such as cadmium telluride (CdTe), cadmium (Cd), zinc (Zn), tellurium (Te), gallium arsenide (GaAs), or thallium bromide (TlBr) have drawn attention as technologies of producing radiation detectors for detecting radiations such as gamma rays.

The semiconductor radiation detector converts electric charge to an electric signal, which charge is generated by a radiation interacting with a semiconductor crystal. The detector has various features such as better conversion efficiency than a scintillator-based detector, and a potential for downsizing of the detector.

In addition, the semiconductor radiation detector comprises: a semiconductor crystal; a cathode electrode on a surface of the semiconductor crystal; and an anode electrode opposed to the cathode electrode across the semiconductor crystal sandwiched between the cathode and anode electrodes. In the detector, a high DC voltage applied to the cathode electrode and the anode electrode generates electric charge caused by incoming radiations like an X-ray or gamma rays coming into the semiconductor crystal, then the electric charge is picked up as a signal from the cathode electrode or anode electrode.

Among the semiconductor crystals described above, a thallium bromide crystal in particular has a higher linear attenuation coefficient in the photoelectric effect than other semiconductor crystals such as cadmium telluride, cadmium, zinc, tellurium, and gallium arsenide. This enables a relatively thinner thallium bromide crystal to achieve the same level of gamma ray sensitivity as other semiconductor crystals. The thinner crystal can make the size of a radiation measurement device equipped with a semiconductor radiation detector configured with a thallium bromide crystal and the size of the nuclear medicine diagnosis system comprising such measurement device smaller than other radiation measurement devices equipped with other semiconductor radiation detectors and than other nuclear medicine diagnosis system comprising such other measurement devices.

In addition, thallium bromide is less expensive than other semiconductor crystals such as cadmium telluride, cadmium, zinc, tellurium, and gallium arsenide. The less expensive semiconductor crystal lowers the production cost of the radiation measurement device equipped with a thallium bromide base semiconductor radiation detector, and the production cost of the nuclear medicine diagnosis system comprising such measurement device, below the costs of other radiation measurement devices configured with other semiconductor radiation detectors, and below the cost of other nuclear medicine diagnosis systems comprising such other measurement devices.

Additionally, thallium layers are inserted between a thallium bromide crystal and both of the ordinary cathode electrode and anode electrode of a semiconductor radiation detector configured with a thallium bromide crystal. The insertion prevents a polarization and achieves a long stable operation due to the formation reaction of thallium metal and thallium bromide (see patent document 1 and non-patent document 1 for example).

Hereinafter, the polarisation means an aberration of a crystal structure or characteristics, and described in detail later.

In addition to the insertion of a thallium layer between the thallium bromide crystal and the cathode and anode electrodes of a semiconductor radiation detector, the polarity of the voltage for collecting electric charge applied to the detector may be reversed at regular time intervals. This achieves an even longer stable operation of the detector due to the reversible formation reaction of metal thallium and thallium bromide (see patent document 1 and non-patent document 2 for example).

PRIOR ART DOCUMENTS

Patent Document

Patent document 1: Japanese Patent Application Laid-open 2009-156800

Non-Patent Document

Non-Patent document 1: Nucl. Instr. and Meth. A, vol. 585 (2008), P 102-104
Non-Patent document 2: Nucl. Instr. and Meth. A, vol. 607 (2009), P 112-115

SUMMARY OF THE INVENTION

Problem to be Solved

For attaining a long stable operation of a radiation measurement device equipped with a semiconductor radiation detector configured with a thallium bromide crystal, or a long stable operation of a nuclear medicine diagnosis system comprising such measurement device, the polarity of the voltage for collecting electric charge applied to the detector is reversed at regular time intervals. In this case, however, every time the polarity is reversed, an interruption occurs in the measurements, and the radiation measurement device or the nuclear medicine diagnosis system temporarily stops working.

In one example of medical examinations with a nuclear medicine diagnosis system comprising a radiation measurement device, gamma rays emitted from the body of the subject is measured to monitor the gamma rays' variations with the elapsing time. Such examination may be an examination of brain functions or heart and vascular functions.

Another example of the examinations with a nuclear medicine diagnosis system is the First-pass method, which examines heart functions using a gamma camera or a SPECT image pickup.

In the First-pass method, a lump of concentrated radiopharmaceuticals is rapidly injected from a peripheral vein, and is dynamically monitored while the radiopharmaceuticals are passing through the venous system, right heart, lung circulation, left heart, and arterial system.

In such aforementioned examples, a continuous, uninterrupted measurement of radiation is required, and shortening the periodic interruption periods in the measurement is necessary.

Accordingly, when the polarity of the voltage applied to the detector for collecting electric charge is reversed for the sake of a longer time use of a thallium bromide base semiconductor radiation detector, reducing the time taken for changing the voltage is desirable.

However, if the polarity reverse rate is too large for the voltage applied to the semiconductor radiation detector, an excessively large current may flow into the amplifier, which amplifies a detecting signal of gamma rays from the semiconductor radiation detector, and the amplifier may be damaged.

The present invention has been made to resolve the aforementioned problem. The objective of the present invention is to provide a radiation measurement device, which is free of a polarization and capable of a measurement with short periodic interruption periods, and to provide a nuclear medicine diagnosis system comprising such measurement device.

Means for Attaining the Objective

In order to solve the abovementioned problem and achieve the objective of the present invention, a radiation measurement device of the present invention is configured as follows.

The radiation measurement device includes: a semiconductor radiation detector detecting a radiation, a capacitor applying voltage to the semiconductor radiation detector; one or more direct current power supplies each capable of making either of positive and negative electric charge collect on one of the electrodes of the capacitor; a constant-current device conducting an electric current from the one or more direct current power supplies to the one of the electrodes of the capacitor; and two or more switching devices installed in the wiring connecting the one or more direct current power supplies and the one of the electrodes of the capacitor.

This configuration can shorten the periodic interruption periods in the measurements of radiations, to prevent damage to the amplifier, and to take stable measurements free of a polarization.

Advantageous Effect of the Invention

The present invention can provide a radiation measurement device which shortens periodic interruption periods in measurements, prevents damage to an amplifier, and is capable of taking stable measurements free of a polarization; and can provide a nuclear medicine diagnosis system comprising such measurement device.

BRIEF DESCRIPTION OF THE DRAWINGS

FIG. 3 is a diagram illustrating a circuit configuration of the radiation measurement device of a second embodiment of the present invention.

FIG. 4 is a diagram illustrating a circuit configuration of the radiation measurement device described in a comparative example.

DETAILED DESCRIPTION OF THE EXEMPLARY EMBODIMENT

Hereinafter, a radiation measurement device and a nuclear medicine diagnosis system comprising such measurement device of the present embodiment is described in detail with reference to the related drawings.

(First Embodiment of Radiation Measurement Device)

Figure 1:
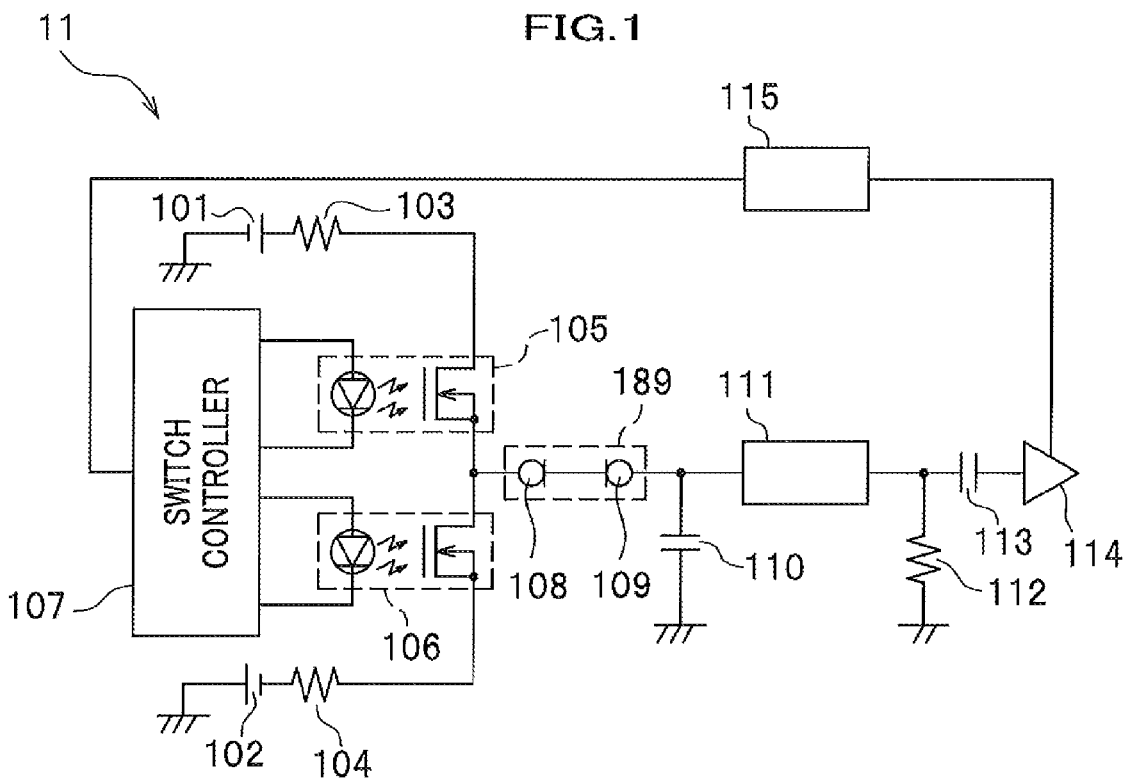
FIG. 1 is a block diagram illustrating a circuit configuration of the radiation measurement device of a first embodiment of the present invention.

FIG. 1 is a block diagram illustrating a circuit configuration of the radiation measurement device of a first embodiment of the present invention. In FIG. 1, a radiation measurement device 11 includes: a semiconductor radiation detector 111 (hereinafter referred to as detector or radiation detector) having a semiconductor crystal with a cathode electrode and an anode electrode on opposing two faces of the crystal, a smoothing capacitor 110 applying a voltage to the detector 111, a first direct current power supply 101 supplying positive electric charge to one of the electrodes of the smoothing capacitor 110, and a second direct current power supply 102 supplying negative electric charge to the one of electrodes of the smoothing capacitor 110.

In addition, the radiation measurement device 11 includes: a first constant current diode 108 installed in the wiring by adjusting the polarity of the constant current characteristics so that the current flows from the first direct current power supply 101 to the one of the electrodes of the smoothing capacitor 110; a second constant current diode 109 installed in the wiring by adjusting the polarity of the constant current characteristics so that the current flows from the one of the electrodes of the smoothing capacitor 110 to the second direct current power supply 102; a first photo MOS relay 105 installed in the wiring that connects the first direct current power supply 101 and the one of the electrodes of the smoothing capacitor 110; and a second photo MOS relay 106 installed in the wiring that connects the second direct current power supply 102 and the one of the electrodes of the smoothing capacitor 110.

Further provided are a resistor 103 between the positive electrode of the first direct current power supply 101 and the first photo MOS relay 105, and a resistor 104 between the negative electrode of the second direct current power supply 102 and the second photo MOS relay 106 for preventing an excess current.

Switching of the first photo MOS relay 105 and the second photo MOS relay 106 is controlled by a switch controller 107.

Further, the output terminal of the detector 111 is connected to a bleeder resistor 112 and one of the electrodes of a coupling capacitor 113. The other one of the electrodes of the coupling capacitor 113 is connected to an amplifier 114 that amplifies a signal from the detector 111. In addition, the switch controller 107 and the amplifier 114 are connected to a polarity total controller 115 that controls the switching of the photo MOS relays 105 and 106. The polarity total controller 115 also controls the timing of reversing the polarity of the amplifier 114.

The negative electrode of the first direct current power supply 101, the positive electrode of the second direct current power supply 102, the electrode other than the one of the electrodes of the smoothing capacitor 110, and one of the electrodes of the bleeder resistor 112 are each connected to a ground.

Each of the first photo MOS relay 105 and the second photo MOS relay 106 is a relay. For this purpose, a photo MOS relay is used due to its quick response, and high reliability because of its configuration free of mechanical junctions, which may cause a malfunction such as chattering.

The first constant current diode 108 and the second constant current diode 109 are connected in series with the polarities of the constant-current characteristics of the diodes opposed to each other, and constitute the constant-current device 189. The constant-current characteristic of a conventional constant current diode in the first constant current diode 108 and the second constant current diode 109 stems from a short-circuit configuration between the source electrode and the gate electrode of a Field Effect Transistor (FET). When, however, a reverse voltage is applied to the diode, the p-n junction formed in a field-effect transistor is forward biased, and too large a current flow occurs despite the constant-current characteristic of the diode. In other words, the current characteristic of the constant current diode has polarity. However, the first constant current diode 108 and the second constant current diode 109, that are connected in series with the polarities of constant-current characteristics of the diodes opposed to each other, produces a constant-current characteristic regardless of the polarity of each diodes. In this manner, the constant-current device 189 has a constant-current characteristic regardless of the polarity of the applied voltage by adopting a configuration in which the first constant current diode 108 and the second constant current diode 109 are connected in series with the polarities of the constant-current characteristics of the diodes opposed to each other.

When measuring radiations such as gamma rays using the radiation measurement device 11, a bias voltage (e.g. +500V or −500V) for collecting electric charge is applied to the cathode electrode and the anode electrode of the detector 111 with the first direct current power supply 101 or the second direct current power supply 102 and with the smoothing capacitor 110. When the gamma rays enter the detector 111 under the applied bias voltage, the semiconductor crystal constituting the detector 111 interacts with the incoming gamma rays, generating electric charge such as electrons and positive holes.

The generated electric charge is output as a gamma ray detection signal from the detector 111. This gamma ray detection signal is input to the amplifier 114 via the coupling capacitor 113. The bleeder resistor 112 controls the output voltage of the detector 111 so that the voltage does not rise too high by stopping the electric charge from collecting in the coupling capacitor 113. The amplifier 114 converts the gamma ray detection signal, which is a weak electric charge, to voltage and then amplifies the signal.

The gamma ray detection signal amplified by the amplifier 114 is then converted to a digital signal by an AD converter (not shown) in a subsequent stage, then the gamma ray detection signal of each energy level of the gamma rays is picked up by a data processor (not shown).

(Polarization)

When the semiconductor crystal which constitutes the detector 111 is made from, for example, thallium bromide and a bias voltage of, for example, +500V is continuously applied to the detector 111 with the first direct current power supply 101, the semiconductor crystal undergoes a polarization (an aberration of crystal structure and characteristics) and the gamma ray energy resolution of the radiation measurement device 11 is deteriorated. The polarization occurs in 20 minutes to 50 hours depending on the type of the electrodes and on the quality of the semiconductor crystal which constitutes the detector 111.

To prevent the polarization, the polarity of the bias voltage applied to the detector 111 has to be periodically reversed. That is, the reverse of the polarity from +500V to V, or from −500V to +500V, has to be carried out. The polarity reverse may occur, for example, every 10 minutes at shortest or 40 hours at longest. Owing to the periodic reverse of the polarity of the bias voltage, a continuous stable operation of the radiation measurement device 11 can be maintained over a period of 500 hours.

However, when reversing the polarity of the bias voltage, periodic interruption periods in the radiation measurement are generated. During the period, the absolute value of the bias voltage is not sufficient for collecting the electric charge, and not sufficient for picking up the signals of the electric charge generated by the gamma rays. A shorter periodic interruption period in the measurement is favorable for the radiation measurement device applied to a nuclear medicine diagnosis system, or in the field of the homeland security.

In addition, the strength of the electric current flowing into the amplifier 114 is the product of a time variation of the voltage of the smoothing capacitor 110 and the capacitance of the coupling capacitor 113. Accordingly, a large time variation of the voltage applied to the smoothing capacitor 110 may generate an electric current stronger than the limiting value. The strong current flowing into the amplifier 114 may damage the amplifier. Therefore, when reversing the polarity of the bias voltage, the absolute value of the rate of the bias voltage change has to be controlled below the predetermined value.

(Control Techniques to Prevent Polarization, First Example)

Hereinafter a control technique to prevent polarization of the radiation measurement device 11 of the present embodiment is described as a first example with reference to FIGS. 1 and 2.

Figure 2:
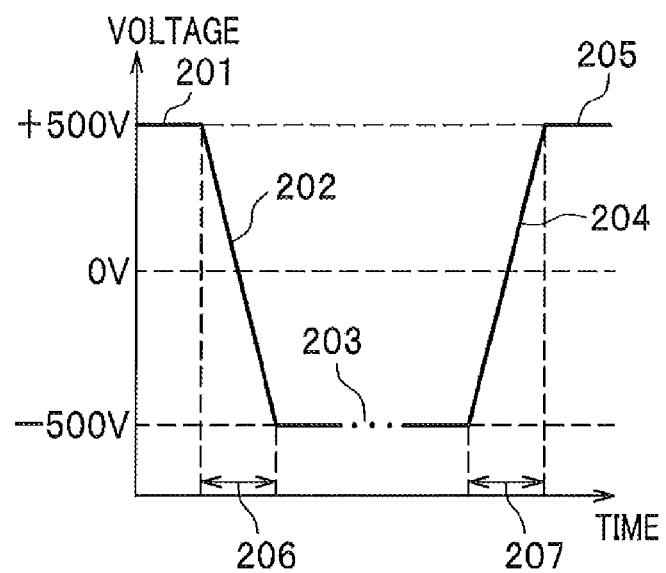
FIG. 2 is a diagram illustrating a time variation of a bias voltage applied to the semiconductor radiation detector in the radiation measurement device of the first embodiment of the present invention.

FIG. 2 is a diagram illustrating a time variation of a bias voltage applied to the detector 111, the horizontal axis representing time and the vertical axis representing voltage.

First, an application of a bias voltage of +500V to the detector 111 is described. A positive DC bias voltage is supplied with the first direct current power supply 101. Since a direct application of a bias voltage of +500V from the first direct current power supply 101 to the detector 111 may generate noises, the voltage is applied to the detector 111 via the smoothing capacitor 110. That is, the bias voltage is actually applied to the detector 111 with the smoothing capacitor 110.

While applying a positive bias voltage, the switch controller 107 keeps the photo MOS relay 105 closed (the photo MOS relay 105 is in an ON state) and the photo MOS relay 106 open (the photo MOS relay 106 is in an OFF state).

The smoothing capacitor 110 is charged via the constant current diode 108 (and constant current diode 109) to make the voltage of the smoothing capacitor 110 become +500V. Consequently, the bias voltage applied to the detector 111 also becomes +500V. In contrast, when applying a bias voltage of −500V to the detector 111, a negative DC bias voltage is applied with the second direct current power supply 102.

While applying a negative bias voltage to the detector 111, the switch controller 107 opens the photo MOS relay 105 and closes the photo MOS relay 106. The smoothing capacitor 110 is charged via the constant current diode 109 to make the voltage of the smoothing capacitor 110 become −500V. In this embodiment, the bias voltage applied to the detector 111 can be reversed by positive or negative electric charge collecting on one of the electrodes of the smoothing capacitor 110.

The polarity total controller 115 sends one of those command signals "positive bias", "negative bias", "reverse bias from positive to negative", and "reverse bias from negative to positive" to the switch controller 107 and to the amplifier 114 according to a preset time schedule for reversing the polarity. The switch controller 107 opens or closes the photo MOS relays 105 and 106 according to the command signal.

(Characteristics of Embodiment)

In the embodiment hereinafter described, the measurement device 11 comprises: the smoothing capacitor 110 with a capacitance of 0.1 μF; the constant current diodes 108 and 109 each with a limiting current value of 0.5 mA; the coupling capacitor 113 with a capacitance of 1000 pF; the amplifier 114 with a limiting current value of 10 μA; and the bias voltage with the polarity reversed every 30 minutes.

First, when a "positive bias" command signal is sent from the polarity total controller 115, the photo MOS relay 105 is closed and the photo MOS relay 106 is opened by the switch controller 107. As a result, positive electric charge collects in the smoothing capacitor 110 via the constant current diode 108, and the bias voltage applied to the detector 111 becomes +500V (201 in FIG. 2).

Next, when a "reverse bias from positive to negative" command signal is sent from the polarity total controller 115, the switch controller 107 opens the photo MOS relay 105, then immediately closes the photo MOS relay 106. Positive electric charge having collected in the smoothing capacitor 110 flows to the second direct current power supply 102 via the constant current diode 109. In reverse, negative electric charge collects in the smoothing capacitor 110, and in 0.3 seconds (206 in FIG. 2) the voltage of the smoothing capacitor 110 becomes −500V. In this manner, when the polarity of the voltage of the smoothing capacitor 110 is reversed, the time variation of the bias voltage applied to the detector 111 is expressed in a linear slope (202 in FIG. 2) and the bias voltage rapidly reaches −500V. This is the effect of the constant current diode 109.

After that, while a "negative bias" command signal is sent from the polarity total controller 115, the photo MOS relay 105 is open and the photo MOS relay 106 is closed by the switch controller 107. Thus negative electric charge collects in the smoothing capacitor 110 via the constant current diode 109 (and via constant current diode 108), and the voltage applied to the detector 111 becomes −500V (203 in FIG. 2).

Thirty minutes after the "reverse bias from positive to negative" command signal is sent from the polarity total controller 115, a "reverse bias from negative to positive" command signal is sent. Then the switch controller 107 opens the photo MOS relay 106, then immediately closes the photo MOS relay 105. Negative electric charge having collected in the smoothing capacitor 110 flows to the first direct current power supply 101 via the constant current diode 108. In reverse, positive electric charge collects in the smoothing capacitor 110, and in 0.3 seconds (206 in FIG. 2) the voltage of the smoothing capacitor 110 becomes +500V.

When the polarity of the voltage of the smoothing capacitor 110 is reversed, the time variation of the bias voltage applied to the detector 111 is expressed in a linear slope (204) and the bias voltage rapidly reaches +500V. This is the effect caused by the constant current diode 108.

After that, a command signal "positive bias" is sent again by the polarity total controller 115, and the bias voltage of +500V applied to the detector 111 is maintained (205 in FIG. 2).

In the above case, the both periodic interruption periods 206 and 207 in the measurement are 0.3 seconds. Here, avoiding the damage to the amplifier 114 is necessary by controlling the current flowing through the amplifier so that the strength of the current does not exceed the limiting current value of the amplifier. In this embodiment, the capacitance of the coupling capacitor 113 is 1000 pF and the limiting current value of the amplifier 114 is 10 μA. Therefore, the absolute value of the rate change of the voltage of the smoothing capacitor 110 needs to be controlled so as not to exceed 10000V/sec. Actually, in this embodiment, the absolute value of the rate change increases up to 3300V/sec. Since the capacitance of the coupling capacitor 113 is 1000 pF, the current flowing through the amplifier 114 increases up to 3.3 μA. The value is lower than the limiting current value of the amplifier 114, i.e. 10 μA.

In addition, the polarity of the electric charges generating the gamma ray detection signal input to the amplifier 114 is dictated by the polarity of the bias voltage applied to the detector 111. Accordingly, the polarity of the amplifier also needs to be switched. In response to the command signal, i.e. "positive bias", "negative bias", "reverse bias from positive to negative", or "reverse bias from negative to positive" sent from the polarity total controller 115 to the amplifier 114, the polarity of the amplifier 114 is switched respectively to "handling negative electric charge", "handling positive electric charge", "reverse from handling negative electric charge to handling positive electric charge", or "reverse from handling positive electric charge to handling negative electric charge".

The radiation measurement device 11 of the present embodiment is capable of a stable measurement free of a polarization with short periodic interruption periods, while preventing damage to the amplifier.

(Characteristics Comparison Between Constant Current Diode and Resistor)

Described above are the characteristics of a constant current diode. Next, a comparative example employing a resistor without using a constant current diode is described. Then, the features and advantages of a constant current diode are highlighted referring to the results of the comparative example.

(Characteristics of Comparative Example when Using Resistor)

Figure 5:
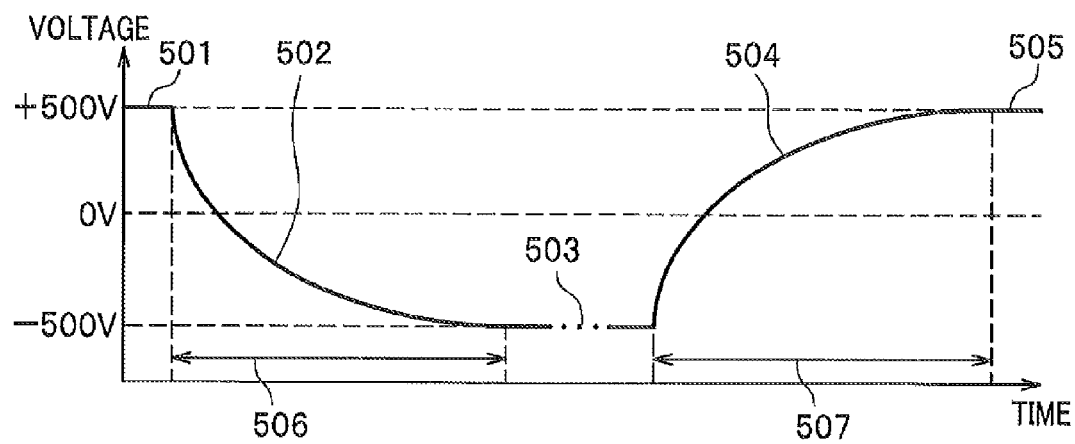
FIG. 5 is a diagram illustrating a time variation of a bias voltage applied to the semiconductor radiation detector of the radiation measurement device described in the comparative example.

FIGS. 4 and 5 illustrate the circuit and characteristics of the comparative examples having a resistor instead of the diode. (Meanwhile, FIG. 3 illustrates a second embodiment and is mentioned later.)

In the comparative example as shown in FIG. 4, a radiation measurement device 51 comprises a resistor 408 instead of the constant current diodes 108 and 109 of the radiation measurement device 11 of the present embodiment. A periodic interruption period in the gamma ray measurement with the radiation measurement device 51 in this comparative example is measured, and then the periodic interruption period of the device 51 is compared with the periodic interruption period of the radiation measurement device 11 of the present embodiment.

In the radiation measurement device 51, a switch controller 407 switches photo MOS relays 405 and 406 according to a control signal of a polarity total controller 414.

The comparative example describes the device 51 comprising the smoothing capacitor 409 with a capacitance of 0.1 g, the coupling capacitor 412 with a capacitance of 1000 pF, the amplifier 413 with a limiting current value of 10 μA, the resistor 408 with a resistance of 1MΩ, and the bias voltages with the polarity reversed every 30 minutes.

First, the polarity total controller 414 sends a "positive bias" command signal, then the photo MOS relay 405 is closed and the photo MOS relay 406 is opened by the switch controller 407. Positive electric charge collects in the smoothing capacitor 409 via the resistor 408, and the bias voltage applied to the detector 410 becomes +500V (501 in FIG. 5).

Next, the polarity total controller 414 sends a "reverse bias from positive to negative" command signal, then the photo MOS relay 405 is opened first, and immediately, the photo MOS relay 406 is closed. Positive electric charge having collected in the smoothing capacitor 409 flows to the second direct current power supply 402 via the resistor 408. Inversely, negative electric charge collects in the smoothing capacitor 409, and in 1.8 seconds, the bias voltage applied to the detector 410 becomes −500V (the tail of 502 in FIG. 5).

When the polarity of the voltage of the smoothing capacitor 409 is reversed, the absolute value of the time variation of the bias voltage applied to the detector 410 increases up to 7000V/sec. The current flowing through the amplifier 413 increases up to 7.0 μA. This is a value lower than the limiting current value of the amplifier 413, i.e. 10 μA. Eventually, however, the potential difference between the smoothing capacitor 409 and the second direct current power supply 402 becomes smaller, and accordingly the time variation 502 of the voltage of the smoothing capacitor 409 starts gradually decreasing. As a result, the periodic interruption period 506 of the measurement is 1.8 sec, which is longer than that of the present embodiment in which the bias voltage linearly changes due to the constant current diode.

Thereafter, while the polarity total controller 414 is sending a "negative bias" command signal, the bias voltage applied to the detector 410 maintains −500V just like the present embodiment (503 in FIG. 5).

30 minutes after the polarity total controller 414 sends the "reverse bias from positive to negative" command signal, the controller 414 sends a "reverse bias from negative to positive" command signal. The photo MOS relay 406 is opened, and immediately the photo MOS relay 405 is closed by the switch controller 407. Negative electric charge having collected in the smoothing capacitor 409 flows to the first direct current power supply 401 via the resistor 408. In reverse, positive electric charge collects in the smoothing capacitor 409, and in 1.8 seconds the bias voltage applied to the detector 410 becomes +500V (504 and 505 in FIG. 5).

When the polarity of the voltage of the smoothing capacitor 409 is reversed, the absolute value of the time variation of the bias voltage applied to the detector 410 increases up to 7000V/sec. The current flowing through the amplifier 413 increases up to 7.0 μA. This is a value lower than the limiting current value of the amplifier 413, i.e. 10 μA. Eventually, however, the time variation 504 of the voltage of the smoothing capacitor 409 starts gradually decreasing. As a result, the periodic interruption period 507 of the measurement is 1.8 sec, which is longer than that of the present embodiment in which the bias voltage linearly changes due to the constant current diode.

As shown in the comparison of the characteristics of the circuits between FIGS. 1 and 4, in the circuit of FIG. 1, the maximum time variation of the bias voltage is 3300V/sec and the maximum current to the amplifier is 3.3 μA, while in the circuit of FIG. 4, the maximum time variation of the bias voltage is 7000V/sec and the maximum current to the amplifier is 7.0 μA. The circuit of FIG. 1 gives a smaller impact on the amplifier. Nevertheless, the periodic interruption period is 0.3 sec in the circuit of FIG. 1, and 1.8 sec in the circuit of FIG. 4. The circuit of FIG. 1 deteriorates the measurement to a lesser extent, and the periodic interruption period is greatly shortened by five-sixths.

In other words, with respect to all these three important characteristics, i.e. the maximum time variation of the bias voltage, the maximum current to the amplifier, and the length of the periodic interruption period, the circuit of FIG. 1 in the radiation measurement device 11 of the present embodiment produces more favorable results and is a distinct improvement on the circuit of FIG. 4. This is due to the difference between the resistor having the characteristics shown in FIG. 5, and the constant current diodes having the characteristics shown in FIG. 2.

In the circuit using a resistor having the characteristics of FIG. 5, a strong current flows while there is a large potential difference between the both ends of the resistor. However, when the potential difference between the both ends of the resistor becomes smaller, the strength of the current gradually decreases, and so does the voltage change of the smoothing capacitor 409 (FIG. 4). As a result the polarity reverse is completed in a longer time. In the circuit of FIG. 1, the constant-current device 189 (constant current diode 108 and constant current diode 109) makes a certain amount of current keep on flowing even when the difference in the potentials between the both ends becomes smaller. The time taken for reversing the electrical potential of the smoothing capacitor 110 (FIG. 1) is reduced.

In addition, as far as the strength of the current is constant, no excessive current flows even in the initial stage in which the potential difference of the smoothing capacitor 110 (FIG. 1) is large, and the current passing through the amplifier 114 is controlled below the limiting current value.

In this connection, the same effects can be achieved by any constant current device or constant current circuit having the constant current characteristics, since this effect is caused by the "constant current" created by a constant current diode.

(Second Embodiment of Radiation Measurement Device)

FIG. 3 is a block diagram illustrating a circuit configuration of the radiation measurement device of a second embodiment of the present invention. In FIG. 3, a radiation measurement device 21 includes: a semiconductor radiation detector 312 (hereinafter simply referred to as detector) having a semiconductor crystal with a cathode electrode and an anode electrode on opposing two faces of the crystal; a smoothing capacitor 311 applying voltage to the detector 312; and a direct current power supply 301 supplying positive electric charge or negative electric charge to one of the electrodes of the smoothing capacitor 311.

In addition, the radiation measurement device 21 includes: a first constant current diode 309 installed by adjusting the polarity of the constant current characteristics so that the current flows from the direct current power supply 301 to the one of the electrodes of the smoothing capacitor 311, a second constant current diode 310 installed by adjusting the polarity of the constant current characteristics so that the current flows from the one of the electrodes of the smoothing capacitor 311 to the direct current power supply 301, a first photo MOS relay 304 installed in the wiring that connects the positive electrode of the direct current power supply 301 and the one of the electrodes of the smoothing capacitor 311, a second photo MOS relay 305 installed in the wiring that connects the negative electrode of the direct current power supply 301 and the one of the electrodes of the smoothing capacitor 311, a third photo MOS relay 306 connected to a ground from the positive electrode of the direct current power supply 301, and a fourth photo MOS relay 307 connected to a ground from the negative electrode of the direct current power supply 301.

The constant-current device 319 comprises the first constant current diode 309 and the second constant current diode 310 connected in series with the polarities of the constant current characteristics of the diodes opposed to each other.

Further provided are a resistor 302 between the positive electrode of the direct current power supply 301 and the first photo MOS relays 304 and 306, and a resistor 303 between the negative electrode of the direct current power supply 301 and the second photo MOS relays 305 and 307 for preventing an excessive current.

The switch controller 308 controls of the photo MOS relays 304 to 307.

In addition, one of the electrodes of the bleeder resistor 313 and one of the electrodes of the coupling capacitor 314 are connected to the detector 312, and the other electrode of the coupling capacitor 314 is connected to the amplifier 315 that amplifies a signal from the detector 312.

Further, a polarity total controller 316, which controls the photo MOS relays 304 to 307 as well as the timing of reversing the polarity of the amplifier 315, is connected to the switch controller 308 and to the amplifier 315.

The other electrode of the smoothing capacitor 311 other than the one of the electrodes of the smoothing capacitor 311 and one of the electrodes of the bleeder resistor 313 are each connected to a ground.

When measuring radiations such as gamma rays with the radiation measurement device 21, a positive or negative bias voltage, e.g. +500V or −500V, for collecting electric charge is applied to the electrode planes of the cathode electrode or anode electrode of the detector 312 with the direct current power supply 301 and the smoothing capacitor 311 The signal processing operation by the gamma ray detector 312 at the time of gamma rays coming into the detector 312 is the same as that of the detector of the first embodiment.

Like the first embodiment, when the detector 312 comprises the semiconductor crystal of, for example, thallium bromide, and when a bias voltage of, for example, +500V is continuously applied to the detector 312, the polarization may occur.

Hereinafter, a second example describes a control technique for preventing the polarization in the radiation measurement device 21 of the present embodiment with reference to FIGS. 2 and 3.

(Control Techniques to Prevent Polarization, Second Example)

First, a bias voltage of +500V is applied to the detector 312. The bias voltage directly applied to the detector 312 by the direct current power supply 301 may generate noises. The voltage is therefore applied to the detector 312 via the smoothing capacitor 311. The switch controller 308 closes the photo MOS relays 304 and 307, and opens the photo MOS relays 305 and 306 when a positive bias voltage is applied to the detector 302.

The smoothing capacitor 311 is charged via the constant current diode 309 (and constant current diode 310), and the voltage of the smoothing capacitor 311 become +500V. Consequently, the bias voltage applied to the detector 312 also becomes +500V. In contrast, when applying a bias voltage of −500V to the detector 312, the switch controller 308 opens the photo MOS relays 304 and 307, and closes the photo MOS relays 305 and 306. The smoothing capacitor 311 is charged via the constant current diode 310, and the voltage of the smoothing capacitor 311 becomes −500V.

The polarity total controller 316 sends one of those command signals "positive bias", "negative bias", "reverse bias from positive to negative", and "reverse bias from negative to positive" to the switch controller 308 and to the amplifier 315 according to a preset schedule for reversing the polarity. The switch controller 308 switches the photo MOS relays 304 to 307 according to the command signal.

In the embodiment hereinafter described, the measurement device 21 comprises: the smoothing capacitor 311 with a capacitance of 0.1 g; the constant current diodes 309 and 310 each with a limiting current value of 0.5 mA; the coupling capacitor 314 with a capacitance of 1000 pF; the amplifier 315 with a limiting current value of 10 μA; and the bias voltage with the polarity reversed every 30 minutes.

First, when a "positive bias" command signal is sent from the polarity total controller 316, the photo MOS relays 304 and 307 are closed and the photo MOS relays 305 and 306 are opened by the controller 308. As a result, positive electric charge collects in the smoothing capacitor 311 via the constant current diode 309, and the bias voltage applied to the detector 312 becomes +500V (201 in FIG. 2).

Next, when a "reverse bias from positive to negative" command signal is sent from the polarity total controller 316, the switch controller 308 opens the photo MOS relays 304 and 307, then immediately closes the photo MOS relays 305 and 306. Positive electric charge having collected in the smoothing capacitor 311 flows to the second direct current power supply 301 via the constant current diode 310. In reverse, negative electric charge collects in the smoothing capacitor 311, and in 0.3 seconds, the voltage of the smoothing capacitor 311 becomes −500V. In this manner, when the polarity of the voltage of the smoothing capacitor 311 is reversed, the time variation of the bias voltage applied to the detector 312 is expressed in a linear slope (202) and rapidly reaches −500V. This is the effect caused by the constant current diode 310.

After that, while a "negative bias" command signal is sent from the polarity total controller 316, the photo MOS relays 304 and 307 are opened, and the photo MOS relays 305 and 306 are closed by the switch controller 308. Thus negative electric charge collects in the smoothing capacitor 311 via the constant current diode 310, and the voltage applied to the detector 312 becomes −500V (203 in FIG. 2).

30 minutes after the "reverse bias from positive to negative" command signal is sent from the polarity total controller 316, a "reverse bias from negative to positive" command signal is sent. Then the switch controller 308 opens the photo MOS relays 305 and 306, then immediately closes the photo MOS relays 304 and 307. Negative electric charge having collected in the smoothing capacitor 311 flows to the direct current power supply 301 via the constant current diode 309. In reverse, positive electric charge collects in the smoothing capacitor 311, and in 0.3 seconds the voltage applied to the smoothing capacitor 311 becomes +500V. When the polarity of the voltage of the smoothing capacitor 311 is reversed, the time variation of the bias voltage applied to the detector 312 is expressed in a linear slope (204) and the bias voltage rapidly reaches +500V. This is the effect caused by the constant current diode 309.

After that, a command signal "positive bias" is sent again by the polarity total controller 316, and the bias voltage of +500V applied to the detector 312 is maintained (205 in FIG. 2).

In the above case, the both periodic interruption periods 206 and 207 in the measurement become 0.3 seconds like the first embodiment. Since the absolute value of the change rate of the voltage of the smoothing capacitor 311 increases approximately up to 3300V/sec, the electric current passing through the amplifier 315 increases up to 3.3 μA. This value is lower than the limiting current value of the amplifier 315.

The radiation measurement device 21 of the present embodiment is capable of a stable measurement free of a polarization with short periodic interruption periods, preventing damage to the amplifier like the radiation measurement device 11 of the first embodiment.

Further, in the radiation measurement device 21 of the present embodiment, the number of direct current power supplies can be reduced although the number of photo MOS relays is larger than in the radiation measurement device 11 of the first embodiment. Since the cost of a direct current power supply is generally higher than that of a photo MOS relay, the radiation measurement device 21 of the present embodiment brings the production cost lower than the radiation measurement device of the first embodiment.

(First Application Example of a Radiation Measurement Device of the Present Embodiment Applied to a Nuclear Medicine Diagnosis System)

The above mentioned radiation measurement device 11 of the first embodiment and radiation measurement device 21 of the second embodiment may be applied to a nuclear medicine diagnosis system.

Figure 6:
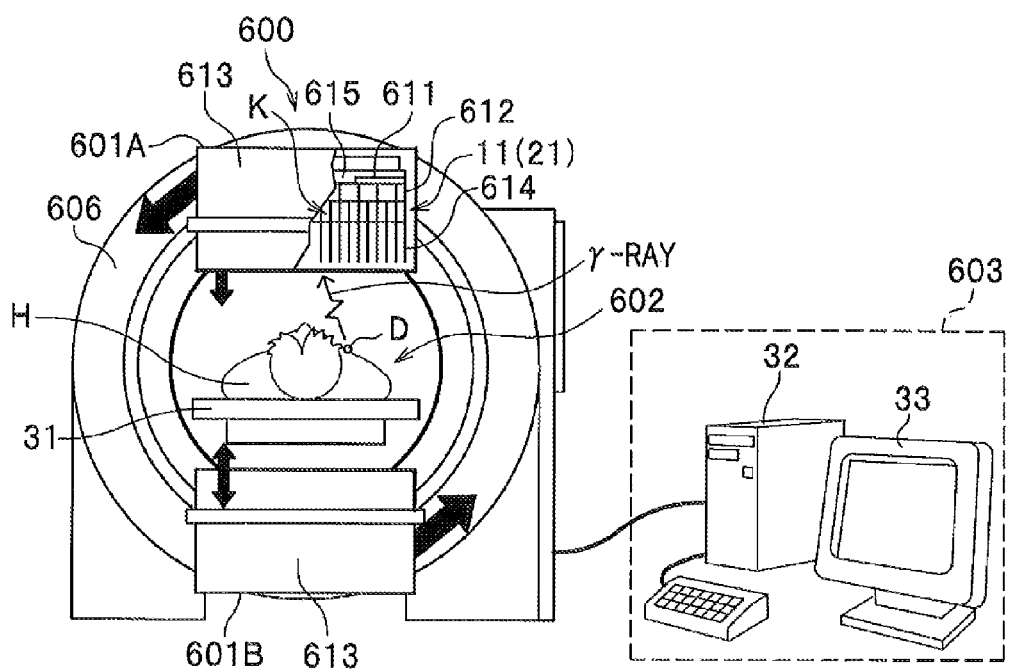
FIG. 6 is a general outline illustrating a Single Photon Emission Computed Tomography (SPECT) as a first application example of the radiation measurement device of the present invention applied to a nuclear medicine diagnosis system comprising such device.

FIG. 6 illustrates the radiation measurement device 11 of the first embodiment or the radiation measurement device 21 of the second embodiment applied to a SPECT image pickup 600 as a nuclear medicine diagnosis system. In FIG. 6, the SPECT image pickup 600 includes: two radiation detection blocks 601A and 601B respectively located up and down, a rotation support platform 606, a bed 31, and a visual information generator 603, all of which surround a measurement area 602 located in the midsection of the SPECT image pickup 600.

The radiation detection block 601A in the upper part includes a plurality of radiation measurement units 611, unit support members 615, and a lightproof electromagnetic shield 613. The radiation measurement unit 611 includes a plurality of radiation measurement devices 11 (or 21), printed circuit boards 612, and collimators 614. The radiation detection block 601B in the lower part is similarly configured. The visual information generator 603 comprises a data processor 32 and a display 33.

The radiation detection blocks 601A and 601B are disposed on the rotation support platform 606 apart from each other along the platform circumference by 180 degrees. More specifically, the unit support members 615 (only one of them is shown in the figure) for the radiation detection blocks 601A and 601B are mounted on the rotation support platform 606 in the positions apart from each other along the platform circumference by 180 degrees. Further, the plurality of radiation measurement units 611 including the printed circuit board 612 is detachably attached to the unit support member 615.

Each of a plurality of the radiation measurement devices 11 is mounted on the printed circuit board 612 and then disposed in each of the multiple sections K each partitioned by the collimators 614. Each of the collimators 614 is made from radiation shielding material (e.g. lead, tungsten), and forms one of multiple radiation paths allowing radiations (e.g. gamma ray) to pass through.

All of the printed circuit boards 612 and the collimators 614 are arranged in the lightproof electromagnetic shield 613 disposed on the rotation support platform 606. The lightproof electromagnetic shield 613 shields the radiation measurement device 11 and the other components from the effects of electromagnetic waves other than gamma rays.

In the SPECT image pickup 600, a bed 31 supporting the subject H, to whom a radiopharmaceutical has been administered, is moved, and the subject H is transferred into a space between a pair of the radiation detection blocks 601A and 601B. Rotating the rotation support platform 606 makes each of the radiation detection blocks 601A and 601B circle around the subject H, thereby starting the examination.

When gamma rays are emitted from the subject H's accumulation part D (e.g. the affected part) where the radiopharmaceutical is accumulated in the body of the subject H, the emitted gamma rays pass through radiation paths of the collimator 614 and enter the corresponding radiation measurement device 11. Each of the radiation measurement devices 11 outputs gamma ray detection signals. The gamma ray detection signals of each energy level of the gamma rays are separately picked up by the data processor 32, and the information brought with the signals is displayed on the display 33.

In FIG. 6, the radiation detection blocks 601A and 601B starts turning as indicated by the thick arrows while supported by the rotation support platform 606. In this manner, an image pickup and the measurement are carried out changing the angles to the subject H. The radiation detection blocks 601A and 601B are vertically mobile as indicated by the thin arrows making the distance between the blocks and the subject adjustable.

According to the SPECT image pickup 600, it is possible to shorten the periodic interruption periods in the radiation measurement caused by reversing the polarity, for the sake of preventing the polarization, of the bias voltage applied to the radiation detector for collecting electric charge.

(Advantages of Nuclear Medicine Diagnosis System of the Present Embodiment)

The advantageous effects achieved by the SPECT image pickup 600 as a nuclear medicine diagnosis system of the present embodiment are as follows. The SPECT image pickup 600 of the present embodiment can shorten the periodic interruption periods of the radiation measurement caused by reversing the polarity, for the sake of preventing polarization, of the bias voltage applied to the radiation detector for collecting electric charge. That makes it possible to monitor the heart muscle blood flow more accurately in an examination of the heart function by collecting data on the time variations of the gamma rays emitted from the subject. It is further possible to calculate heart function parameters through the First-pass method. Herewith, it is possible to conduct an early diagnosis of coronary arteriosclerosis, to more accurately determine the degree of the severity of the coronary lesion, and to assess the effects of the treatment.

The aforementioned radiation measurement devices 11 and 21 of the first and second embodiment may be used not only for the SPECT image pickup 600 above, but also for a gamma camera and PET image pickup, as a nuclear medicine diagnosis device. Next, an application example to a PET image pickup is described.

(Second Application Example of a Radiation Measurement Device of the Present Embodiment Applied to a Nuclear Medicine Diagnosis System)

Figure 7:
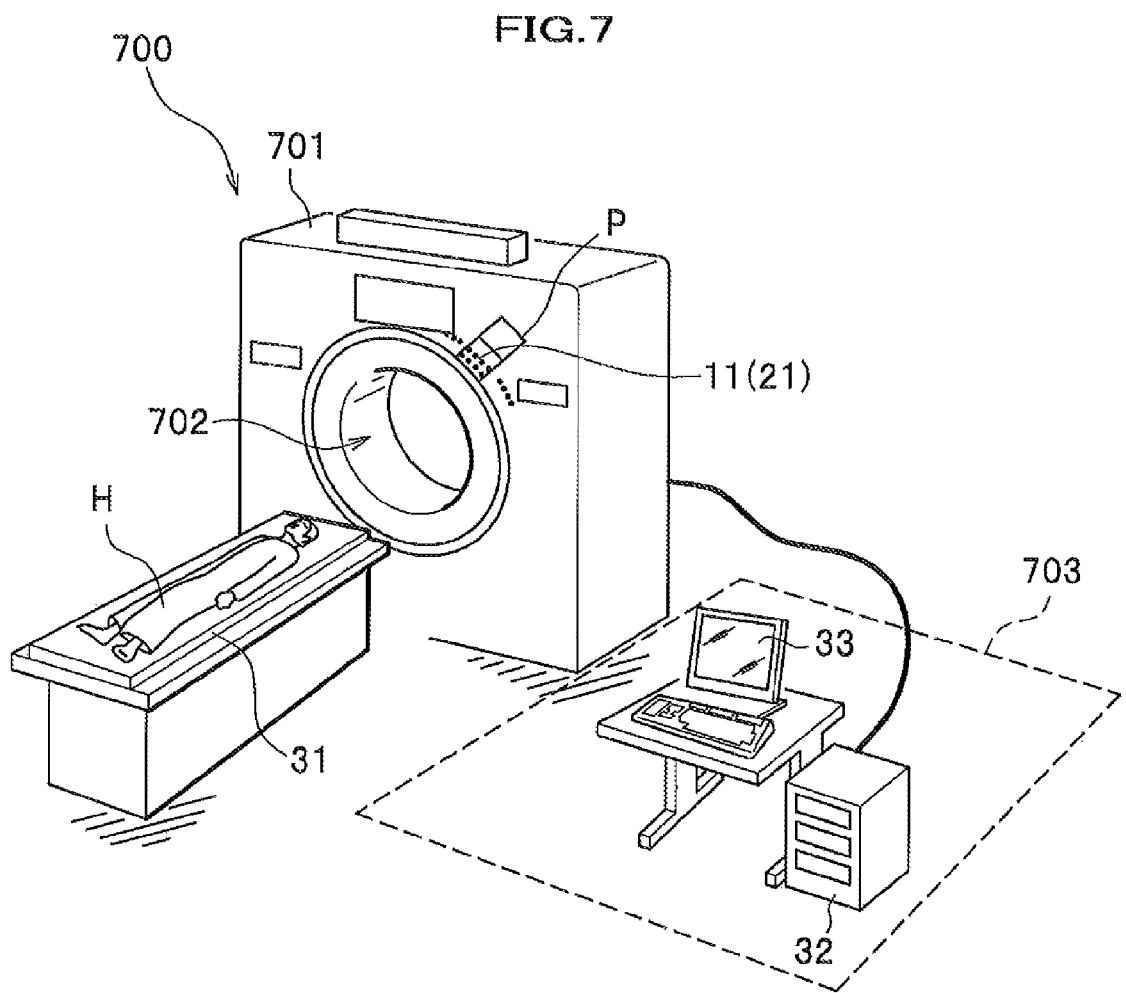
FIG. 7 is a general outline illustrating a Positron Emission Tomography (PET) as a second application example of the radiation measurement device of the present invention applied to a nuclear medicine diagnosis system comprising the device.

FIG. 7 illustrates a PET image pickup 700, which is a nuclear medicine diagnosis system comprising a radiation measurement device 11 of the first embodiment or a radiation measurement device 21 of the second embodiment.

In FIG. 7, the PET image pickup 700 includes: an image pickup 701 having a cylinder-shaped measurement area 702 in a central portion thereof; a bed 31 supporting a subject H and mobile in a longitudinal direction, and a visual information generator 703. The visual information generator 703 further includes a data processor 32 and a display 33.

The image pickup 701 includes a printed circuit board P on which a plurality of the radiation measurement devices 11 (or 21) is disposed surrounding the measurement area 702. The PET image pickup 700 includes a digital ASIC (Application Specific Integrated Circuit for digital circuit, Digital data processing circuit, not shown); and is configured to generate a packet including the energy level of the gamma rays, the time, and the detected channel ID (Identification) of the radiation measurement device 11 (or 21), and the generated packet is input to the data processor 32.

In the examination, the gamma rays emitted from the body of the subject H due to the radiopharmaceutical are detected by the radiation measurement device 11 (or 21). More specifically, when a positive electron emitted from the radiopharmaceutical for PET imaging vanishes, a pair of gamma rays are emitted each running in the 180 degree opposite direction, and are detected by separate detection channels of a plurality of the radiation measurement device 11 (or 21). The picked-up gamma ray detection signals are input to the corresponding digital ASIC. The signal processing is performed as described before, and the information about the location of the detection channel that has detected the gamma ray and the information about the time of detecting the gamma ray are input to the data processor 32.

In the data processor 32, a pair of gamma rays generated by one vanishing positive electron are counted as one ray (coincidence counting), and the locations of two detection channels that have detected the pair of gamma rays are identified based on the location information. In addition, the data processing device 32 generates cross-sectional image information (image information) of the location where the radiopharmaceutical is accumulated, i.e. the location of tumor, based on the value obtained by the coincidence counting and based on the location information of the detection channel. The cross-sectional image information is displayed on the display 33.

According to the PET image pickup 700, it is possible to shorten periodic interruption periods of radiation measurement caused by reversing, for the sake of preventing polarization, the polarity of the bias voltage applied to the radiation detector for collecting electric charge. Therefore it is possible to reduce the time for examining the subject H when diagnosing a diseased part of tumor. Thus the discomfort of the subject can be alleviated, and more subjects per day can be examined.

Other Embodiments

Thus, with respect to a radiation measurement device, in the first embodiment shown in FIG. 1 and the second embodiment in FIG. 3, the first constant current diodes (108, 309) and the second constant current diodes (109, 310) are connected in series. Alternatively, a radiation measurement device may be configured using more than two constant current diodes. In addition, another device or a circuit may be used as long as it has constant current characteristics.

Further, with respect to a radiation measurement device, in the first embodiment shown in FIG. 1 and in the second embodiment in FIG. 3, examples using the photo MOS relays 105, 106, 304, 305, 306, and 307 are shown. Since the required function is a relay, they do not have to be a photo MOS relay. Conventional relays may be used as long as the relays have a sufficient reliability.

Further, with respect to a nuclear medicine diagnosis system, in FIGS. 6 and 7, the data processor 32 and the display device 33 are shown to serve as examples of the image information generation devices 603 and 703. Because of the wide variation of the configurations of data processing, the image information generators are not limited to the combination of the data processor 32 and the display 33.

The present invention provides a radiation measurement device, which can conduct a stable measurement without a polarization while reducing the periodic interruption periods in the measurement, also preventing damages to the amplifier The invention also provides a nuclear medicine diagnosis system comprising such radiation measurement device.

INDUSTRIAL APPLICABILITY

According to the radiation measurement device of the present invention and the nuclear medicine diagnosis system comprising such measurement device, it is possible to enhance the reliability of the device and system and to shorten the periodic interruption periods in the measurement. With many advantages not only for an examiner but also for the subject, the present invention has a potential of being utilized and applied in the related technological fields.

DESCRIPTION OF THE SYMBOLS 11, 21, 51 radiation measurement device
31 bed
32 data processor
33 display
101, 401 first direct current power supply
102, 402 second direct current power supply
103, 104, 302, protective resistor
303, 403, 404 protective resistor
105, 304, 405 first photo MOS relay (photo MOS relay)
106, 305, 406 second photo MOS relay (photo MOS relay)
301 direct current power supply
306 third photo MOS relay
307 fourth photo MOS relay
107, 308, 407 switch controller
108, 309 first constant current diode (constant current diode)
109, 310 second constant current diode (constant current diode)
110, 311, 409 smoothing capacitor (capacitor)
111, 312, 410 semiconductor radiation detector, radiation detector, detector
112, 313, 411 bleeder resistor
113, 314, 412 coupling capacitor (capacitor)
114, 315, 413 amplifier
115, 316, 414 polarity total controller
189, 319 constant-current device
206, 207, 506, 507 periodic interruption period in measurement
301 direct current power supply
408 resistor
600 SPECT image pickup (nuclear medicine diagnosis device)
601A, 601B radiation detection block
602, 702 measurement area 603, 703 image information generation device
606 rotation support platform
612 printed circuit board
611 radiation measurement unit
613 lightproof electromagnetic shield
614 collimator
615 unit support member
700 PET image pickup (nuclear medicine diagnosis device)
701 image pickup
702 measurement area
D accumulated part
H object to be examined subject
K area partitioned by collimator
P printed circuit board

The invention claimed is:

1. A radiation measurement device, comprising:
a semiconductor radiation detector detecting a radiation;
a capacitor applying voltage to the semiconductor radiation detector;
one or more direct current power supplies capable of making either of positive and negative electric charge collect on one of the electrodes of the capacitor;
a constant-current device conducting an electric current from the one or more direct current power supplies to the one of the electrodes of the capacitor; and
two or more switching devices installed in a wiring connecting the one or more direct current power supplies and the one of the electrodes of the capacitor.

2. The radiation measurement device according to claim 1, further comprising:
an amplifier amplifying an output signal from the semiconductor radiation detector;
a switch controller controlling the switching operations of the two or more switching devices; and
a polarity total controller sending any one of command signals of "a positive bias", "a negative bias", "a reverse bias from positive to negative", and "a reverse bias from negative to positive" to the amplifier and the switch controller.

3. The radiation measurement device according to claim 1, wherein:
the one or more direct current power supplies include a first direct current power supply capable of making positive electric charge collect on the one of the electrodes of the capacitor;
the one or more direct current power supplies also include a second direct current power supply capable of making negative electric charge collect on the one of the electrodes of the capacitor;
the constant-current device conducts an electric current from either of the first and second direct current power supplies to the one of the electrodes of the capacitor;
the two or more switching devices include a first switching device installed in the wiring connecting the first direct current power supply and the one of the electrode of the capacitor; and
the two or more switching devices also include a second switching device installed in the wiring connecting the second direct current power supply and the one of the electrode of the capacitor.

4. The radiation measurement device according to claim 2, wherein:
the one or more direct current power supplies include a first direct current power supply capable of making positive electric charge collect on the one of the electrodes of the capacitor;
the one or more direct current power supplies also include a second direct current power supply capable of making negative electric charge collect on the one of the electrodes of the capacitor;
the constant-current device conducts an electric current from either of the first and second direct current power supplies to the one of the electrodes of the capacitor;
the two or more switching devices include a first switching device installed in the wiring connecting the first direct current power supply and the one of the electrode of the capacitor; and
the two or more switching devices also include a second switching device installed in the wiring connecting the second direct current power supply and the one of the electrode of the capacitor.

5. The radiation measurement device according to claim 1, wherein:
the one or more direct current power supplies include one direct current power supply capable of making either of positive and negative electric charge collect on the one of the electrodes of the capacitor;
the constant-current device conducts an electric current from the one direct current power supply to the one of the electrode of the capacitor;
the two or more switching devices include a first switching device installed in the wiring connecting the positive electrode of the one direct current power supply and the one of the electrode of the capacitor;
the two or more switching devices also include a second switching device installed in the wiring connecting the negative electrode of the one direct current power supply and the one of the electrode of the capacitor;
the two or more switching devices further include a third switching device installed in the wiring connecting the positive electrode of the one direct current power supply and a ground; and
the two or more switching devices further include a fourth switching device installed in the wiring connecting the negative electrode of the one direct current power supply and a ground.

6. The radiation measurement device according to claim 2, wherein:
the one or more direct current power supplies include one direct current power supply capable of making either of positive and negative electric charge collect on the one of the electrodes of the capacitor;
the constant-current device conducts an electric current from the one direct current power supply to the one of the electrode of the capacitor;
the two or more switching devices include a first switching device installed in the wiring connecting the positive electrode of the one direct current power supply and the one of the electrode of the capacitor;
the two or more switching devices also include a second switching device installed in the wiring connecting the negative electrode of the one direct current power supply and the one of the electrode of the capacitor;
the two or more switching devices further include a third switching device installed in the wiring connecting the positive electrode of the one direct current power supply and a ground; and
the two or more switching devices further include a fourth switching device installed in the wiring connecting the negative electrode of the one direct current power supply and a ground.

7. The radiation measurement device according to claim 1, wherein the constant-current device comprises two constant current diodes connected in series with the polarities of the constant-current characteristics of the diodes opposed to each other.

8. The radiation measurement device according to claim 1, wherein the semiconductor radiation detector comprises a thallium bromide radiation detector.

9. The radiation measurement device according to claim 1, wherein the two or more switching devices comprise photo MOS relays.

10. A nuclear medicine diagnosis system, comprising:
a bed supporting a subject to be examined;
a plurality of radiation measurement devices disposed in a measurement area receiving the subject;
an image data processor producing an image according to the collected data based on radiation detection signals output from the plurality of radiation measurement devices,
wherein each of the plurality of radiation measurement devices is the radiation measurement device according to claim 1.

* * * * *